United States Patent
Henkel et al.

(10) Patent No.: US 8,333,210 B1
(45) Date of Patent: Dec. 18, 2012

(54) LEAK ISOLATION LOGIC FOR CLOSED-VOLUME SYSTEM

(75) Inventors: Karl P. Henkel, Ellington, CT (US); Kurt J. Doughty, Berlin, CT (US); Daniel Uttberg, Agawam, MA (US); Eric A. Rohrbach, Lebanon, CT (US); Terrance R. Snider, Belchertown, MA (US)

(73) Assignee: Hamilton Sundstrand Corporation, Windsor Locks, CT (US)

( * ) Notice: Subject to any disclaimer, the term of this patent is extended or adjusted under 35 U.S.C. 154(b) by 64 days.

(21) Appl. No.: 13/161,911

(22) Filed: Jun. 16, 2011

(51) Int. Cl.
*F15D 1/00* (2006.01)

(52) U.S. Cl. ....... 137/15.11; 137/563; 62/310; 165/108; 165/200

(58) Field of Classification Search .............. 137/15.11, 137/563; 165/108, 200; 73/40.5 R; 62/310
See application file for complete search history.

(56) References Cited

U.S. PATENT DOCUMENTS

| | | | | | |
|---|---|---|---|---|---|
| 4,653,532 | A | * | 3/1987 | Powers | 137/563 |
| 5,226,471 | A | * | 7/1993 | Stefani | 165/200 |
| 6,098,412 | A | * | 8/2000 | Porter et al. | 62/126 |
| 6,450,254 | B1 | * | 9/2002 | Hoyle et al. | 165/200 |
| 6,820,465 | B2 | * | 11/2004 | Summers et al. | 137/312 |
| 7,392,818 | B2 | * | 7/2008 | Hsu et al. | 137/563 |

* cited by examiner

*Primary Examiner* — Kevin Lee
(74) *Attorney, Agent, or Firm* — Kinney & Lange, P.A.

(57) ABSTRACT

A method for isolating a leak in a closed-volume liquid system comprises circulating a fluid through a plurality of isolatable zones and a non-isolatable zone in a closed-volume liquid system, detecting a leak in the closed-volume liquid system, isolating all of the isolatable zones from the non-isolatable zone, sequentially detecting if the leak is present in the non-isolatable zone and each of isolatable zones, and taking corrective action after the leak is detected.

22 Claims, 2 Drawing Sheets

LEAK ISOLATION LOGIC FOR CLOSED-VOLUME SYSTEM

CROSS-REFERENCE TO RELATED APPLICATION(S)

Reference is made to a patent application entitled "LEAK DETECTION LOGIC FOR CLOSED-VOLUME SYSTEM" by K. Doughty, T. Snider, D. Uttberg and E. Rohrbach, Ser. No. 13/161,930, filed on the same day herewith and assigned to the same assignee as the present application, which is incorporated by reference.

BACKGROUND

The present invention relates generally to closed-volume systems such as those used in liquid cooling systems. More particularly, the present invention is directed to methods for isolating a leak in a closed-volume system.

Closed-volume liquid systems include a pump that operates to circulate a fluid through a loop having a fixed volume at constant temperature. The volume varies only with thermal contractions and expansions due to temperature fluctuations. Closed-volume liquid systems are often configured to circulate fluid through various components in aircraft systems. Sometimes the components are critical to controlling and maintaining flight of the aircraft and require prolonged cooling to function. It is imperative to maintain functionality of the components even after a leak in the system occurs. It is therefore desirable to detect and isolate leaks in closed-volume systems as quickly as possible before a significant volume of the liquid is lost and operation of the system can no longer be maintained. Furthermore, leaked fluids from the closed-volume systems can become a fire hazard or can cause interference with operation of electrical equipment. There is, therefore, a need for methods of quickly detecting and isolating a leak in a closed-volume system.

SUMMARY

The present invention is directed to a method for isolating a leak in a closed-volume liquid system. The method comprises circulating a fluid through a plurality of isolatable zones and a non-isolatable zone in a closed-volume liquid system, detecting a leak in the closed-volume liquid system, isolating all of the isolatable zones from the non-isolatable zone, sequentially detecting if the leak is present in the non-isolatable zone and each of the isolatable zones, and taking corrective action after the leak is detected.

DETAILED DESCRIPTION

Figure 1:
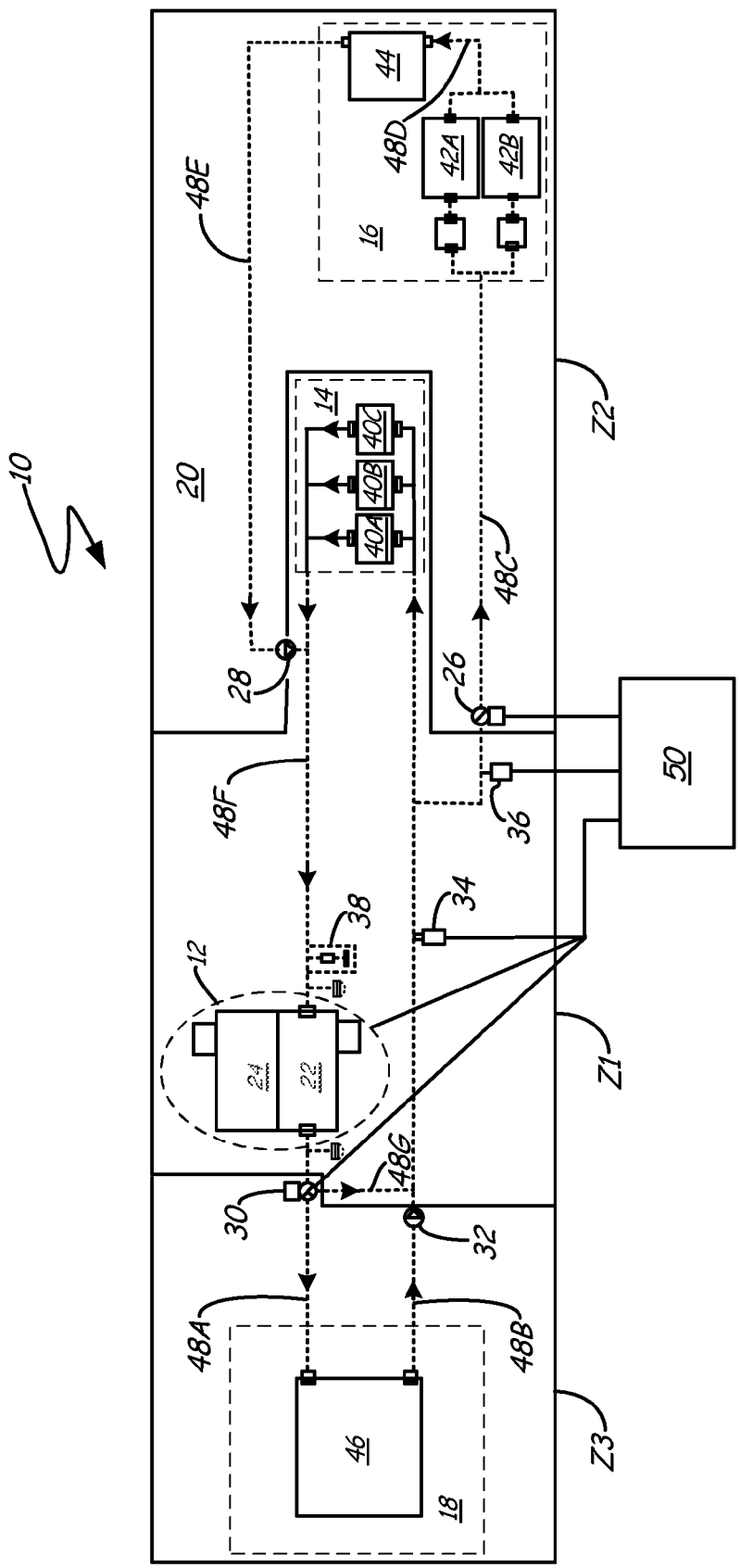
FIG. 1 is a schematic of a closed-volume liquid system used to cool power electronics in an aircraft.

FIG. 1 is a schematic of liquid system 10 having non-isolatable zone Z1 and isoltable zones Z2 and Z3. Pump zone 12 and load zone 14 comprise non-isolatable zone Z1 of system 10, and load zones 16 and 18 comprise isolatable zones Z2 and Z3, respectively, of system 10. Pump zone 12 includes pump 22 and reservoir 24. Liquid system 10 includes first control valve 26 and first check valve 28, which are associated with isolatable zone Z2, and second control valve 30 and second check valve 32, which are associated with isolatable zone Z3. Liquid system 10 also includes temperature sensor 34, pressure sensor 36 and port 38. Load zone 14 includes electronics 40A, 40B and 40C; load zone 16 includes supplemental cooling units (SCUs) 42A and 42B and heat exchanger 44; and load zone 18 includes heat exchanger 46. Reservoir 24 primes pump 22 such that fluid is circulated through liquid circulation lines 48A-48G. Control system 50 is electrically coupled to control valves 26 and 30, sensors 34 and 36 and pump 22 through appropriate wiring (not all of which is shown in FIG. 1) to operate system 10.

Liquid system 10 comprises a system for circulating fluid through a closed-volume loop. In the described embodiment, system 10 comprises a cooling system integrated into an aircraft power electronics cooling system (PECS) that circulates a cooling fluid. As such, system 10 is typically incorporated into an aircraft airframe including various bays. For example, load zone 14 comprises a pressurized electronics bay within the aircraft including power electronics 40A-40C. Pump zone 12 can be located in an un-pressurized area of the aircraft, such as a wheel well compartment. Load zone 16 comprises a pressurized bulk cargo bay within the aircraft that includes environmental control systems. SCUs 42A and 42B comprise condensers of a vapor-cycle cooling system that is coupled to another liquid control system (LCS). Heat exchanger 44 is coupled with a low pressure air cooling system. Load zone 18 comprises a ram air duct exposed to ambient airstreams and includes heat exchanger 46.

Pump 22 pressurizes a cooling fluid within loop lines 48A-48G. The fluid flows from pump 22, through control valve 30 to heat exchanger 46 through liquid line 48A. Cooling air passing through the ram air duct of zone 18 cools the cooling fluid within heat exchanger 46. The cooled fluid travels through liquid line 48B to zone 14. Within zone 14, power electronics 40A-40C input heat to the cooling fluid before the fluid is passed to liquid line 48F and back to reservoir 24. Likewise, the cooled fluid travels in parallel to zone 16 through liquid line 48C. Within zone 16, SCUs 42A and 42B add heat to the cooling fluid, some of which is removed via heat exchanger 44 with air flow as the cooling media. The liquid cooling fluid flows through lines 48D and 48E before the fluid travels back out to liquid line 48F and into pump 22.

Reservoir 24 comprises an expandable-volume enclosure that holds liquid for system 10. Reservoir 24 expands to accommodate volumetric thermal expansion of the liquid cooling fluid. As such, the maximum volume of system 10 is fixed at the upper capacity of reservoir 24. In one embodiment, reservoir 24 is spring-loaded or otherwise biased to maintain liquid engaged with the inlet of pump 22, and in another embodiment, reservoir 24 comprises a bootstrap reservoir, as is known in the art. As such, pump 22 is properly primed at the inlet to prevent cavitation across varying thermal conditions, and the outlet produces the proper pressure increase. Although described with respect to centrifugal pumps that generate pressure-rise, the invention also achieves benefits with respect to other types of pumps, such as positive displacement pumps that generate flow. Flow control valves 26 and 30 remain open during normal operation of system 10 such that fluid flows to zones 16 and 18.

Control system 50 maintains circulation of the liquid cooling fluid through lines 48A-48F at rates adequate to maintain cooling. Control system 50 operates valves 26 and 30 based on input from sensors 34 and 36 to control the amount of cooling provided to power electronics 40A-40C and SCUs 42A and 42B. Control system 50 comprises any conventional computer controller system capable of performing computations on sensor input and executing control logic, as are known in the art. Liquid system 10 circulates fluid to keep electronics 40A-40C and SCUs 42A and 42B operating under normal conditions. Control system 50 includes leak detection logic and leak isolation logic to determine the presence of a leak and subsequently isolate the leak such that system 10 can continue to operate under conditions other than normal.

Under certain conditions or circumstances, flow of liquid through lines 48A-48G may become compromised. For example, a leak may form due to a liquid system failure, an aircraft system failure, or a cargo event. As such, cooling fluid may leak from system 10, diminishing the performance of SCUs 42A and 42B and reducing the cooling to electronics 40A-40C. If the volume of cooling fluid drops within system 10 such that reservoir 24 cannot maintain the inlet to pump 22 properly primed, the pressure in system 10 will drop and flow will be reduced. If enough fluid leaks out, performance of system 10 will be rendered completely ineffective. Control system 50 monitors information relating to the performance of system 10 such that a leak can be detected and isolated with minimal disruption to the operation of system 10.

Cooling of power electronics 40A-40C in load zone 14 is the primary function of liquid system 10. Power electronics 40A-40C control various flight-critical systems, such as landing gear, and are thus extremely important to operation of the aircraft. Heat exchanger 46 is the primary heat sink for heat within the cooling fluid. Heat exchanger 44 in load zone 16 is capable of removing heat from system 10, but is undersized to maintain system 10 operating at normal levels for a prolonged amount of time. SCUs 42A and 42B are used for cabin environmental conditioning systems and are thus not important to operation of the aircraft. Load zones 14-18 are therefore prioritized based on their value to the operation of the aircraft. The most critical zones can be checked for leaks first, reducing time that they are not receiving circulated fluid while the isolation detection logic is performed.

Circulation to load zone 14 is critical, but a leak in zone Z1 cannot be isolated because of the load zone 14 is directly coupled to pump zone 12. Circulation of fluid to zone 18 (part of isolatable zone Z3) is of primary importance because heat exchanger 46 can maintain cooling of electronics 40A-40C indefinitely. Circulation of fluid to zone 16 (part of isolatable zone Z2) is of secondary importance because performance of SCUs 42A and 42B is not a safety concern. Liquid system 10 may include any number of zones, with each zone being ranked in order of importance for needing cooling fluid based on any number of conditions, such as flight-critical function or cooling function. As such, it is imperative that leaks within system 10 be detected and isolated as fast as possible before enough cooling fluid leaks out that system 10 is rendered ineffective. The effective volume of cooling fluid within system 10 depends on the capacity of reservoir 24. Zones 16 and 18 can be fluidly de-coupled from pump 22 and zone 14 by operation of valves 26 and 30 and are therefore isolatable. Control system 50 actuates control valves 26 and 30 to simultaneously isolate zones 16 and 18 until a leak is detected.

Figure 2:
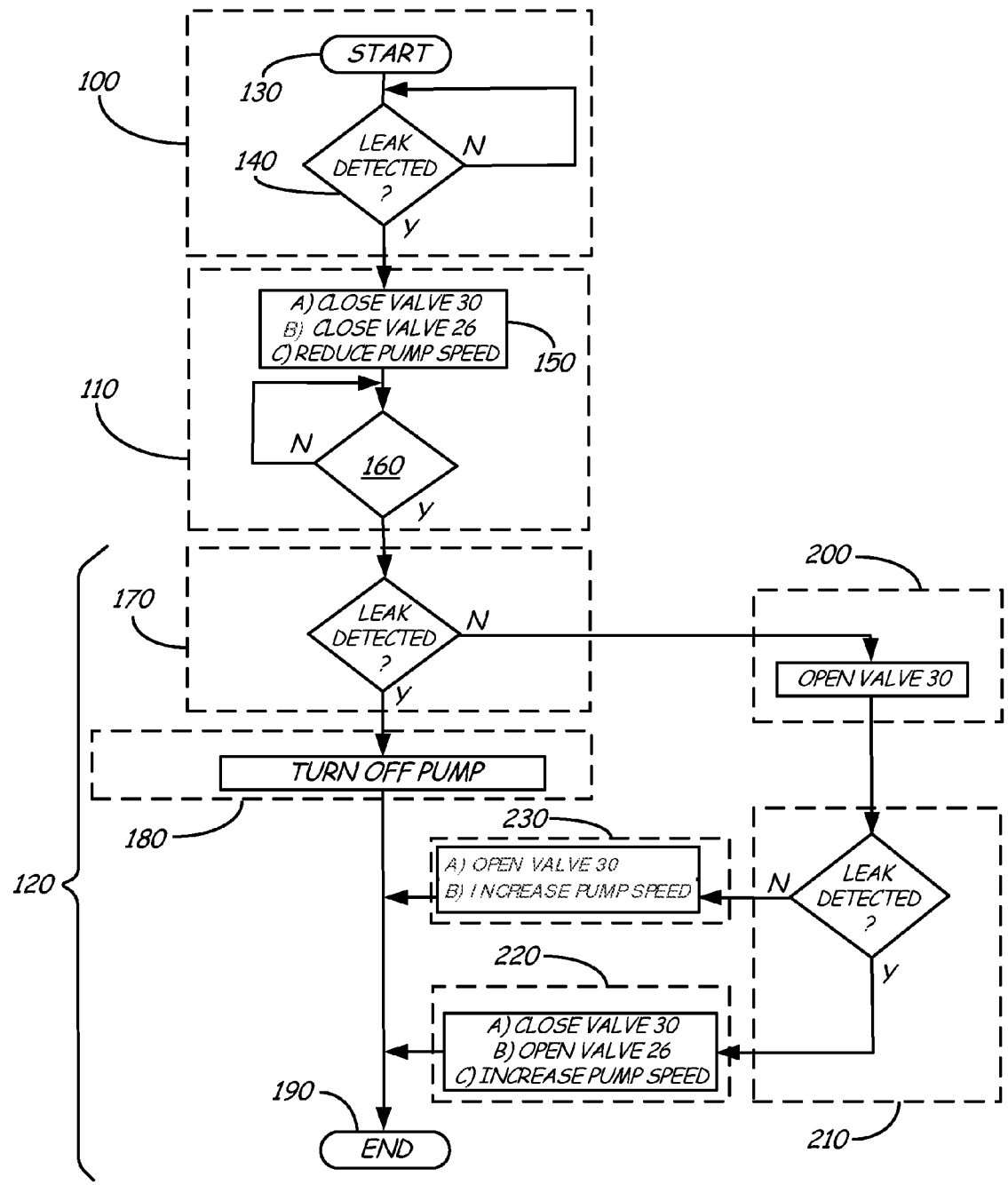
FIG. 2 is a flow chart diagramming a method for isolating a leak in the closed-volume liquid system of FIG. 1.

FIG. 2 is a flow chart diagramming a method for isolating a leak in a closed-volume liquid system. In the described embodiment, the method operates a closed-volume liquid system such as system 10 described with reference to FIG. 1. However, the method may be applied to any closed-loop or closed-volume liquid system having multiple isolatable zones. The method comprises operating phase 100, isolation phase 110 and detection phase 120. In operating phase 100, system 10 is controlled by system 50 to operate under normal conditions at step 130 such that the liquid cooling fluid circulates through all of zones Z1-Z3. For example, the amount of fluid flow to zone Z2 and zone Z3 is changed by adjusting flow control valves 26 and 30, respectively, based on temperature and pressure inputs. Control system 50 includes leak isolation logic that operates in the background to detect if a leak is present in system 10 at step 140. In one embodiment, any conventional leak detection logic can be used. For example, leak detection logic may comprise comparing rates of change of the sensor signals to predetermined, stored values. Control system 50 evaluates the sensor signals at a first threshold level. For example, the pressure signal may be evaluated based on the rate at which the pressure signal changes to determine a pressure drop from a leak. When using two sensor signals, control system 50 can afford to use low thresholds for changes in pressure and level to be sure that the pressure drop is from a leak rather than normal operation. When only a single sensor signal is used, control system 50 uses a higher threshold level, resulting in less sensitivity, to look for a more rapid drop in pressure that is more assuredly indicative of a leak rather than normal operation. If no leak is detected, system 10 continues to operate as normal with leak detection being conducted at regular intervals at step 140. If a leak is detected at step 140, control system 50 transitions to isolation phase 110.

In isolation phase 110, control system 50 closes-off all isolatable zones within system 10 at step 150 such that the fluid is prevented from being circulated by pump 22 through those zones. Control system 50 closes flow control valve 26 such that liquid is prevented from flowing into line 48C and load zone 16 of isolatable zone Z2. Check valve 28 prevents liquid from line 48F from flowing backward into isolatable zone Z2. Control system 50 also closes flow control valve 30 such that liquid is prevented from flowing into line 48A and load zone 18 of isolatable zone Z3. Check valve 32 prevents liquid from line 48B from flowing backward into isolatable zone Z3. As such, liquid continues to flow from the outlet of pump 22 to line 48G, line 48B, zone 14 and line 48F before returning to the inlet of pump 22. Zone 14 is thus fluidly separated from isolatable zone Z2 (comprising load zone 16) and isolatable zone Z3 (comprising load zone 18). Control system 50 also reduces the speed of pump 22 to minimize loss of fluid from system 10 at step 150. Additionally, power to SCUs 42A and 42B can be cut or reduced to limit heat loading of the liquid cooling fluid. At step 160, control system 50 checks to verify if valves 26 and 30 are closed and that the speed of pump 22 is reduced by checking various sensor inputs. Once pump 22 has reached a predetermined pump speed such that changes in the circulated fluid volume can be adequately accommodated, control system 50 is ready to move to detection phase 120.

Control system 50 performs leak detection logic at step 170 to determine if liquid is still leaking from system 10 even though zones Z2 and Z3 are isolated. Input from temperature sensor 34 and pressure sensor 36 continue to provide control system 50 input relating to the performance of system 10. For example, the pressures at the inlet and outlet of pump 22 can be determined to see if the fluid level has decreased. At step 170, control system 50 uses lower threshold levels, such that sensitivity is increased, than at step 140 such that the leak can be more rapidly detected. For example, control system 50 looks for very minute changes in pressure or level because the presence of the leak is already known and, thus, the changes are known to not be from normal operation of the system. If a leak is detected at step 170, control system has determined that the leak is present within non-isolatable zone Z1 (comprising load zone 14) and pump package 12. The leak cannot be isolated from pump 22 and further operation of pump 22 would result in additional liquid being lost. As such, control system 50 shuts down pump 22 at step 180. In such a condition, the leak cannot be mitigated by system 10 and control system 50 therefore stops the leak isolation logic at step 190. The aircraft most likely will then perform a landing maneuver such that maintenance can be performed to fix the leak. Additional fluid can be added to system 10 at port 38 to replace leaked liquid cooling fluid.

If, however, at step 170 a leak is not detected in non-isolatable zone Z1, control system 50 sequentially opens flow control valves 30 and 26 in order of importance of zones 18 and 16, respectively, to isolate the leak. At step 200, control system 50 opens flow control valve 30 to permit liquid to flow into isolatable zone Z3 including heat exchanger 46, the portion of line 48B between heat exchanger 46 and check valve 32, and the portion of line 48A between heat exchanger 46 and control valve 30. Additional components, such as heat exchanger 46 and liquid lines, are brought into the circulative flow with non-isolatable zone Z1 such that control system 50 can additionally perform leak detection logic at step 210 including zone Z3. Similar to step 170, control system 50 uses lower threshold levels (more sensitive) than at step 210 such that the leak can be more rapidly located. If a leak is detected at step 210, control system 50 has isolated the leak and determined that the leak is present in isolatable zone Z3. Control system 50 then takes action at step 220 to isolate zone Z3 from the rest of system 10.

First, at step 220a, flow control valve 30 is closed to prevent further liquid from leaking from system 10. Next, flow control valve 26 is opened to permit circulation of liquid through SCUs 42A and 42B in load zone 16 at step 220b. At step 220c, the speed of pump 22 is increased to speeds conducive for normal operation of system 10 in view of the fact that zone Z3 is isolated. For example, pump 22 may not operate at speeds as high as when all load zones are receiving circulated fluid from pump 22. Finally, control system 50 ceases performing logic to isolate the leak at step 190. Additionally, control system 50, or other aircraft flight and environmental control systems, may increase or initiate operation of heat exchanger 44 to provide cooling to the liquid cooling fluid in non-isolatable zone Z1 and load zone 16. For example, heat exchanger 44 may provide cooling for a sufficient amount of time to electronics 40A-40C such that preparation for an aircraft landing maneuver can be undertaken, such as lowering of landing gear.

If, however, at step 210 a leak is not detected in zone Z3, control system 50 has by default determined that the leak is present in zone 16. Therefore, at step 230a, control system 50 reissues an open command to flow control valve 30 to ensure load zone 18 is receiving cooling fluid. Additionally, control system 50 continues to issue a close command to flow control valve 26 to ensure zone Z2 is isolated from pump 22. At step 230b, the speed of pump 22 is increased to speeds conducive for normal operation of system 10 in view of the fact that zone Z2 is isolated. For example, pump 22 may not operate at speeds as high as when all load zones are receiving circulated fluid from pump 22. Control system 50 then stops performing leak isolation logic at step 190. Thus, the aircraft can continue operating due to the continued performance of electronics 40A-40C. SCUs 42A and 42B can be cooled using heat exchanger 44 if the location of the leak so permits.

Steps 200-220 can be repeated for additional zones included in system 10. For example, if system 10 included a third isolatable zone, at step 230 control system 50 would still need to determine if the leak were in zone Z2 or the third isolatable zone, after eliminating the presence of the leak in zone Z3. Thus, control system 50 would first open valve 26, while the third zone was isolated, and perform the leak detection logic to see if the leak were present in zone Z2. If so, then zone Z2 could be isolated and the third zone could be opened to again receive liquid flow from pump 22. If not, control system 50 would by default determine that the leak is present in the third zone and would take action to isolate the third zone and open all other zones.

The method of the present invention is well-suited for closed-volume systems having any number of independently isolatable zones in flow communication with at least one non-isolatable zone. System 10 can be provided with any number of isolatable zones from N(1) to N(X), where X equals any positive integer representative of the zone relative priority (lower X=higher zone priority). The control system would repeat the leak detection logic a maximum of (X−1) times for the isolatable zones after initial detection. Initial detection occurs with all zones available, then X−1 more detections for the remaining zones can executed until the leak is isolated, for a total of 1+(X−1)=X detection decision blocks potentially occurring. After the leak detection logic is performed for the non-isolatable zone with all of the isolatable zones isolated, single isolatable zones from N(1) to N((X−1) are cumulatively added to the circulation loop one at a time, with leak detection logic being performed after each addition. For example, the N(1) zone is checked first with the N(2) to N(X) zones closed. Next, the N(2) zone would be added to the N(1) zone, followed by the N(3) zone being added to the N(1) and N(2) zones so that the leak check could be repeated at each step. The process is repeated until the leak is detected or only a single isolated zone remains. At such point the isolatable zone in which the leak is detected is re-isolated and all other isolatable zones not already un-isolated as part of the isolation logic can be un-isolated. In other embodiments of the invention, the leak detection logic can be continued to individually check remaining isolatable zone if there is a possibility of multiple isolatable zones leaking due to a single failure mode. Isolatable zones that have been leak tested may, in other embodiments, be returned to an isolated state while other zones are leak tested. Generally, however, it is desirable to un-isolate such zones so that cooling can resume.

The method of the present invention minimizes liquid lost in closed-volume or closed-loop liquid systems. For example, all isolatable zones are closed off after a leak is detected in an attempt to immediately isolate the leak and prevent further fluid losses. Only after each isolatable zone is leak checked will circulation in each zone resume. A reduction in the amount of fluid lost also reduces subsequent clean-up time after the aircraft returns for maintenance. The method of the present invention can also be rapidly implemented after a leak is detected. For example, the leak isolation method is limited in the quickness of performing leak detection analysis at the various steps in the method. Testing has verified that the leak isolation logic can be performed in sufficient time such that the amount of fluid lost remains below levels at which the reservoir can no longer maintain the pump primed. Additionally, the present method allows for prioritizing of leak checking of the isolatable zones such that mission critical operations can be kept running the maximum amount of time. For example, sustainable flight critical components, such as heat exchanger 46, are checked first such that they can be returned to an operative state as soon as possible. Conversely, less critical components, such as SCUs 42A and 42B, are left isolated while leak testing is conducted in other zones.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A method for isolating a leak in a closed-volume liquid system, the method comprising:
   circulating a fluid through a plurality of isolatable zones and a non-isolatable zone in a closed-volume liquid system;
   detecting a leak in the closed-volume liquid system;
   isolating all of the isolatable zones from the non-isolatable zone;
   sequentially detecting if the leak is present in the non-isolatable zone and each of isolatable zones; and
   taking corrective action after the leak is detected.

2. The method of claim 1 wherein the closed-volume liquid system includes a reservoir having a volume expandable between a maximum and a minimum.

3. The method of claim 2 wherein the reservoir is a bootstrap reservoir.

4. The method of claim 2 wherein the closed-volume liquid system comprises a cooling system for an aircraft including multiple isolatable cooling zones and a non-isolatable pump zone through which a pump is configured to circulate a liquid cooling fluid.

5. The method of claim 4 wherein one of the isolatable cooling zones includes a heat exchanger and another of the isolatable cooling zones includes electronics.

6. The method of claim 5 wherein each of the isolatable zones includes a control valve and check valve configured to isolate each isolatable cooling zone from the non-isolatable zone independent of other isolatable zones.

7. The method of claim 6 and further comprising the step of reducing operating speeds of the pump after initially detecting if the leak is present.

8. The method of claim 6 and further comprising the step of reducing heat load of the heat exchanger after initially detecting if the leak is present.

9. The method of claim 1 wherein the step of sequentially detecting if the leak is present comprises:
   circulating the fluid through the non-isolatable zone after isolating the plurality of isolatable zones; and
   detecting if the leak is present in the non-isolatable zone.

10. The method of claim 9 wherein the step of taking corrective action comprises:
    shutting down the closed-volume liquid system if the leak is detected in the non-isolatable zone.

11. The method of claim 9 wherein the step of sequentially detecting if the leak is present further comprises:
    un-isolating each of the isolatable zones one at a time if the leak is not detected in the non-isolatable zone; and
    detecting if the leak is present in the system after each isolatable zone is un-isolated.

12. The method of claim 11 and further comprising:
    leaving each isolatable zone un-isolated after not detecting the leak in said isolatable zone.

13. The method of claim 11 wherein the step of taking corrective action comprises:
    isolating an isolatable zone after detecting the leak in said isolatable zone; and
    un-isolating all remaining isolated isolatable zones.

14. The method of claim 9 and further comprising:
    prioritizing each of the isolatable zones into a hierarchy from most important to least important;
    un-isolating the most important isolatable zone first; and
    detecting if the leak is present in the most important isolatable zone.

15. The method of claim 14 and further comprising
    progressing through detecting the leak in the hierarchy of isolatable zones from most important to least important;
    leaving each isolatable zone un-isolated after failing to detect the leak in each zone;
    closing an isolatable zone when the leak is detected in that zone; and
    un-isolating all remaining isolatable zones.

16. The method of claim 1 wherein:
    the step of detecting a leak in the closed-volume system comprises:
    comparing sensor signals to a first threshold level; and
    the step of sequentially detecting if the leak is present in the non-isolateable zone and each of the non-isolatable zones comprises:
    comparing sensor signals to a second threshold level.

17. A method for isolating a leak in a closed-volume liquid cooling system in an aircraft, the method comprises:
    circulating a liquid cooling fluid through a closed-loop including:
    a non-isolatable zone including a pump and electronics;
    a first load zone independently isolatable from the non-isolatable zone, the first load zone including a first heat exchanger; and
    a second load zone independently isolatable from the non-isolatable zone, the second load zone including a second heat exchanger;
    detecting a leak present in the closed-loop;
    isolating the first and second load zones from the non-isolatable zone;
    detecting if the leak is present in the first load zone;
    re-isolating the first load zone and un-isolating the second load zone if the leak is detected; and
    continuing to isolate the second load zone if the leak is not detected.

18. The method of claim 17 and further comprising:
    detecting if the leak is present in the non-isolatable zone after isolating the first and second load zones; and
    shutting down the cooling system if the leak is detected in the non-isolatable zone.

19. The method of claim 17 and further comprising:
    reducing an operating speed of the pump while isolating the first and second load zones; and
    reducing heat load of one of the first or second heat exchangers before isolating the first and second load zones.

20. The method of claim 17 wherein:
    the step of detecting a leak present in the closed-loop comprises:
    comparing sensor signals to a first threshold level; and
    the step of detecting if the leak presenting the first load zone comprises:
    comparing sensor signals to a second threshold level.

21. A method for isolating a leak in a closed-loop cooling system having a pump that circulates fluid through $N(1)$ to $N(X)$ load zones outside a non-isolatable pump zone, the method comprising:
    actuating $N(1)$ to $N(X)$ valves to independently close-off $N(1)$ to $N(X)$ zones from receiving liquid from the pump zone;
    detecting if a leak is present in the non-isolatable pump zone;
    if the leak is present in the non-isolatable pump zone, shutting off the pump;

if the leak is not present in the non-isolatable zone, detecting if a leak is present in the N(1) zone by opening the N(1) valve;

if the leak is present in the N(1) zone, closing the N(1) valve to isolate the N(1) zone and opening the N(2) to N(X) valves to un-isolate the N(2) to N(X) zones;

if the leak is not present in the N(1) zone, opening the N(2) valve to un-isolate the N(2) load zone and rechecking if the leak is present; and sequentially adding the N(3) to N(X) zones and detecting if the leak is present until the leak is detected or only the N(X) zone remains;

wherein the N(1) zone is ranked as the most critical zone to operation of the cooling system and the N(X) zone being ranked as the least critical zone to the operation of the cooling system.

22. The method of claim 21 and further comprising the steps of:

reducing a speed of a pump in the pump zone while detecting if the leak is present in the N(1) zone; and increasing the speed of the pump after the leak is detected.

* * * * *